United States Patent [19]

Mori et al.

[11] Patent Number: 4,695,167
[45] Date of Patent: Sep. 22, 1987

[54] APPARATUS FOR MIXING AND PUMPING SLURRY

[75] Inventors: Masashi Mori; Shingo Nonaka; Seiji Nagai, all of Okayama, Japan

[73] Assignee: Shinagawa Refractories Co., Ltd., Tokyo, Japan

[21] Appl. No.: 786,858

[22] Filed: Oct. 11, 1985

[30] Foreign Application Priority Data

Nov. 30, 1984 [JP] Japan .......................... 59-180808[U]

[51] Int. Cl.⁴ .......................... B01F 7/08; B01F 15/02
[52] U.S. Cl. .................................. 366/181; 366/186; 366/189
[58] Field of Search ................. 366/51, 190, 194, 189, 366/184, 186, 181

[56] References Cited

U.S. PATENT DOCUMENTS

| | | | |
|---|---|---|---|
| 2,005,996 | 6/1935 | Kraft | 366/189 X |
| 3,203,631 | 8/1965 | Jutila | 366/190 X |
| 3,485,481 | 12/1969 | Zimmerman | 366/51 |
| 3,960,368 | 6/1976 | Kishimoto | 366/189 X |

FOREIGN PATENT DOCUMENTS

| | | | |
|---|---|---|---|
| 355035 | 6/1922 | Fed. Rep. of Germany | 366/190 |
| 56-150425 | 11/1981 | Japan | 366/190 |
| 308631 | 3/1929 | United Kingdom | 366/51 |

Primary Examiner—Robert R. Mackey
Attorney, Agent, or Firm—Larson and Taylor

[57] ABSTRACT

An apparatus for mixing and pumping slurry which is mixed with a refractory aggregate material in a gunning nozzle, characterized in that the apparatus is provided at its upper portion with a slurry mixing apparatus and its lower portion with a pumping apparatus which feeds the slurry under pressure by pump. The mixing apparatus includes an opening at the bottom thereof for the downward discharge of the slurry from the mixing apparatus. The pumping apparatus includes an opening at the top thereof positioned directly below the discharge opening of the mixing apparatus for delivering the slurry to the pump, thereby allowing the regulation and pumping of the slurry to be carried out simultaneously. The slurry is pumped to a gunning nozzle for admixture in a predetermined ratio with refractory aggregate.

1 Claim, 1 Drawing Figure

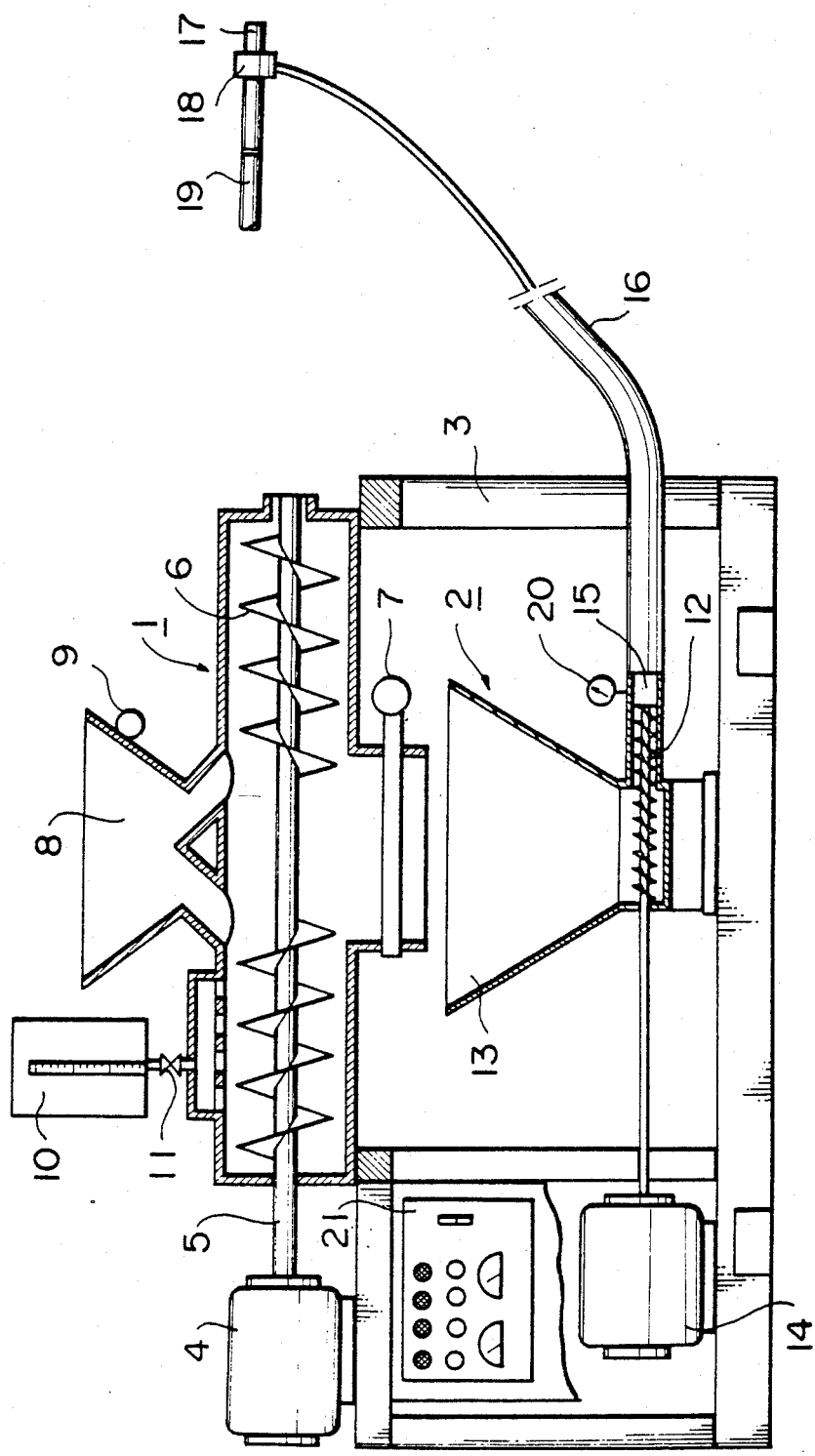

APPARATUS FOR MIXING AND PUMPING SLURRY

FIELD OF THE INVENTION

This invention relates to an apparatus for mixing and pumping a slurry which is subsequently mixed with a refractory aggregate material in a gunning nozzle.

In recent application of a lining of an iron runner of a blast furnace of a vessel for holding molten pig iron, casting is mainly employed in order to improve working efficiency, to shorten application time and to reduce cost. However, a casting installation has drawbacks such as: troublesome working of a monolithic refractory in a large mixer; unwanted setting; and longer curing and drying time. To overcome such problems, attention is being directed to a gunning method.

One gunning method that has been adopted is referred to as a "slurry added gunning method for castable refractories". In this method, slurry as a binder is gunned while being added at a nozzle to an aggregate premixed with a solvent. The method is described in the April 1981 issued of "Refractories" published by The Technical Association of Refractories, Japan. Another gunning method which has been adopted is the so-called slurry mixing system which uses the "refractory gunning mix" described in Japanese Patent Application No. 192,572/83, Publication No. 87079/85 of the same inventors and in which slurry is mixed with a refractory aggregate of regulated particle size and gunned at a gunning nozzle. Compared with conventional dry gunning methods, the methods described above achieve better results in that the water content at the time of application can be substantially reduced thereby enhancing the filling density of the body to be applied. Moreover, it is possible to secure a high quality refractory body equal to the body obtained by vibration forming or casting methods.

However, since the slurry used in the gunning method of the slurry mixing system contains alumina cement or a binder, the viscosity of the slurry deteriorates with time, so that its long storage time is impossible. Accordingly, the slurry is generally regulated on the spot when it is gunned. This causes a problem because it is difficult to prepare and regulate the quality of a slurry on the spot in a large mixer.

Therefore, in this kind of gunning apparatus, small batches (in the range of 10-30 kg) are prepared by stirring the batches with a small-size hand mixer. The slurry thus prepared on the spot is fed into an air pressure-feeding tank which is used in the conventional gunning application method, and finally the slurry is fed to a gunning nozzle through a slurry supply hose under an air pressure in the range of 5-6 $kg/cm^2$.

In the known slurry supply apparatus, not only does it take a longer time to prepare the slurry on the spot thereby resulting in bad efficiency, but also the preparation itself is troublesome, and gunning efficiency is greatly affected by the time required to prepare a slurry. On the other hand, when a highly viscous liquid such as this type of slurry is fed into a gunning nozzle under air pressure, the amount of the slurry supplied to the nozzle will fluctuate with changes in the pressure in the gunning nozzle. In that event, the mixing ratio of the gunning binder to the refractory aggregate fluctuates thereby influencing the quality of the gunned layer. Moreover, the known method is disadvantageous in that after gunning it takes a long time to clean the air pressure-feeding tank.

SUMMARY OF THE INVENTION

The present invention has been made to overcome the foregoing problems. The object of the invention is to provide an apparatus for mixing and pumping a binder slurry for admixture with a refractory aggregate material in a gunning nozzle comprising:

binder slurry mixing means comprising a slurry mixing vessel, means for metering a pre-determined quantity of liquid binder into said mixing vessel, means for introducing a pre-determined quantity of refractory powder into said mixing vessel for admixture with said pre-determined quantity of said liquid binder to form in said mixing vessel a refractory gunning binder slurry suitable for admixture in a gunning nozzle with a premixture of gunning refractory aggregate and solvent to form a castable refractory material suitable for application by gunning, agitating means mounted in said mixing vessel for admixing said liquid binder and refractory powder to form said binder slurry, means for discharging said binder slurry downwardly from said slurry mixing vessel, and means for actuating said binder slurry discharging means;

a frame supporting said binder slurry mixing means;

a pump comprising a rotatable member for pumping said binder slurry to a gunning nozzle for admixture with a premixture of gunning refractory aggregate and solvent to form a castable refractory material suitable for application by gunning, said pump being mounted on said frame means below said mixing vessel and having an inlet for receiving binder slurry from said mixing means and an outlet for delivering the binder slurry to a gunning nozzle;

hopper means mounted directly below said dicharging means for receiving binder slurry discharged downwardly from said mixing vessel, said hopper means having an opening at the bottom thereof located directly above an opening in the upper portion of said pump whereby binder slurry recieved in said hopper means is able to flow directly into said pump;

means for varying the rotational speed of said rotatable pump member to vary the output thereof;

a gunning nozzle comprising means for admixing binder slurry and a premixture of gunning refractory aggregate and solvent to form a castable refractory material suitable for application by gunning and an outlet for discharging said castable refractory material; and hose means for conveying binder slurry from said pump outlet to said gunning nozzle;

whereby the ratio of binder slurry admixed with said premixture of gunning refractory aggregate and solvent can be controlled by regulating the rotational speed of said rotatable pump member independently of variation of the pressure within said gunning nozzle.

DESCRIPTION OF PREFERRED EMBODIMENTS

The invention will now be described more in detail by way of an embodiment with reference to the accompanying drawing which in a diagrammatic sectional elevation view of apparatus according to the invention.

As shown in the attached drawing, the slurry mixing pressure-feeding apparatus for a gunning system according to the invention comprises a slurry mixing apparatus 1 for preparation of a slurry, and a pumping apparatus 2 which feeds the slurry under pump pressure to a gunning nozzle 17, said apparatuses in communication in both the upper and lower directions.

Slurry mixing apparatus 1 is supported by a frame 3 at its upper portion, and is provided with a stirring blade 6 with a rotary shaft 5 which is driven by electric motor 4. Any commercially available slurry mixing apparatus will suffice if it is provided at its lower center with a dumper 7 for discharging slurry.

A hopper 8 for charging refractory powder into the mixer is provided in the upper portion of the mixer, and the hopper is provided at its side face with a vibrator 9 to facilitate charging of the powder. Moreover, a liquid binder measuring tank 10 is mounted so as to be able to charge a desired amount of a liquid binder into the mixer by opening or closing a solenoid valve 11.

The pumping apparatus 2 is arranged below the slurry mixing apparatus 1 in such a manner that a slurry receiving hopper 13 integral with a pressure-feeding pump 12 may be positioned directly below the slurry discharging dumper 7 provided in slurry mixing apparatus 1. The pressure-feeding pump 12 is driven, for example, by a multispeed motor 14 such as with reduction gear. A predetermined amount of discharging slurry can be obtained by controlling the variable speed motor 14 to change the rotational speed of the pressure-feeding pump 12. Further, an outlet 15 of the pressure-feeding pump 12 is connected via a slurry supply hose 16 to a slurry adding device 18 which is assembled with a gunning nozzle 17. The gunning nozzle 17 is connected to a material supply apparatus (not shown) through an aggregate supply hose 19. The refractory aggregate which has been fed under pressure to the nozzle 17 through the aggregate supply hose 19 from the material supply apparatus, is admixed at a fixed ratio with the slurry which is supplied through slurry supply hose 16 from the pressure-pumping apparatus 2. Naturally the proportion of added slurry is predetermindd according to the property of the gunning material to be used. A pressure gauge 20 is provied in the neighborhood of the outlet 15 of the pressure-feeding pump 12, and, as a safety measure, when the pressure of the emitting slurry rises higher than a predetermined pressure, the multispeed motor 14 stops.

A control panel 21 is provided so that the slurry mixing apparatus 1 and the pumping apparatus 2 may be centrally controlled, and so that the preparation and feeding of the slurry may be carried out simultaneously by operation of suitble switches.

In using the present apparatus, a predetermined amount of liquid binder is measured by the binder measuring tank 10, and then the binder is charged into the mixer by opening the solenoid valve 11. The refractory powder which has previously been measured in a desired amount is then charged into the mixer from the hopper 8. The liquid binder and the refractory powder charged into the mixer are mixed by repeated collisions and turbulence due to the action of the stirring blade 6 thereby preparing the slurry.

The slurry thus prepared is fed out of the slurry discharging dumper 7 mounted at the lower center of the slurry mixing apparatus 1, whence it falls down into the slurry receiving hopper 13 integrated with the pressure-feeding pump 12 and it is fed into the pressure-feeding pump. Thereafter, the multispeed motor 14 is driven. In order that a predetermined amount of emitting slurry be made by setting a desired emitting pressure and controlling the multispeed motor 14, the slurry is supplied to the slurry adding device 18 of the gunning nozzle 17 through the slurry supply hose 16 while controlling the rotational speed of the pressure-feeding pump 12, and the refractory aggregate fed under pressure from the material supply tank is admixed with slurry at a fixed ratio set according to the quality of the aggregate.

Then, before the slurry within the slurry receiving hopper 13 integrated with the pressure-feeding pump 12 is completely exhausted, additional slurry is prepared in the slurry mixing apparatus 1, and the additional slurry thus prepared is supplied from the mixing apparatus 1 to the pumping apparatus 2 whereby an efficient gunning application can be carried out. Even when a highly viscous liquid such as the slurry is fed under pressure, it is possible to make the emitting amount of the slurry constant even if the pressure within the gunning nozzle 17 changes, by feeding the liquid under pressure of a pump instead of air thereby resulting in stabilization of the quality of the gunned layer.

EXAMPLE

The following is an example when the mixed slurry pressure-feeding apparatus of the present invention is applied to a gunning system for a molten pig iron vessel.

| Slurry mixing apparatus | |
|---|---|
| Binder measuring tank capacity: | 30 l |
| Mixing capacity: | 100 l (200 kg) |
| Mixer driving motor capacity: | 15 Kw |
| Number of the revolutions of the stirring blade: | 500 r.p.m. |

| Pumping apparatus | |
|---|---|
| Slurry receiving hopper capacity: | 100 l |
| Emmitting pressure: | 2-6 kg/cm$^2$ |
| Slurry emitting amount: | 5-30 l/min. |

As described above in detail, the present invention is constituted in such a manner that a slurry mixing apparatus which regulates the slurry and a pumping apparatus which feeds the slurry by pump under pressure are arranged to communicate with each other in both the upper and lower directions and that th slurry may be prepared and pressure fed simultaneously. Therefore, it is possible to efficiently prepare 100 l slurry in 4–5 minutes. In conventional means, it took 20 to 30 minues to prepare 100 l slurry and it required intricate charging of the slurry into an air pressure feeding tank. Another advantage in using feeding by pump in place of air is that even if the pressure within the gunning nozzle changes, the emitting amount of slurry is maintained constant so that the adding and mixing ratio are stable. As a result, the quality of the gunned layer is stabilized to obtain a uniform lining.

What is claimed is:

1. Apparatus for mixing and pumping a binder slurry for admixture with a refractory aggregate material in a gunning nozzle comprising:
   binder slurry mixing means comprising a slurry mixing vessel, means for metering a pre-determined quantity of liquid binder into said mixing vessel, means for introducing a pre-determined quantity of refractory powder into said mixing vessel for admixture with said pre-determined quantity of said liquid binder to form in said mixing vessel a refractory gunning binder slurry suitable for admixture in a gunning nozzle with a premixture of gunning refractory aggregate and solvent to form a castable refractory material suitable for application by gunning, agitating means mounted in said mixing vessel for admixing said liquid binder and refractory powder to form said binder slurry, means for discharging said binder slurry downwardly from said slurry mixing vessel, and means for actuating said binder slurry discharging means;

a frame supporting said binder slurry mixing means;

a pump comprising a rotatable member for pumping said binder slurry to a gunning nozzle for admixture with a premixture of gunning refractory aggregate and solvent to form a castable refractory material suitable for application by gunning, said pump being mounted on said frame means below said mixing vessel and having an inlet for receiving binder slurry from said mixing means and an outlet for delivering the binder slurry to a gunning nozzle;

hopper means mounted directly below said discharging means for receiving binder slurry discharged downwardly from said mixing vessel, said hopper means having an opening at the bottom thereof located directly above an opening in the upper portion of said pump whereby binder slurry received in said hopper means is able to flow directly into said pump;

means for varying the rotational speed of said rotatable pump member to vary the output thereof;

a gunning nozzle comprising means for admixing binder slurry and a premixture of gunning refractory aggregate and solvent to form a castable refractory material suitable for application by gunning and an outlet for discharging said castable refractory material; and hose means for conveying binder slurry from said pump outlet to said gunning nozzle;

whereby the ratio of binder slurry admixed with said premixture of gunning refractory aggregate and solvent can be controlled by regulating the rotational speed of said rotatable pump member independently of variation of the pressure within said gunning nozzle.

* * * * *